United States Patent
Gerrese et al.

(10) Patent No.: US 11,898,856 B2
(45) Date of Patent: Feb. 13, 2024

(54) AUTONOMOUS VEHICLE LONG DISTANCE RIDES

(71) Applicant: GM Cruise Holdings LLC, San Francisco, CA (US)

(72) Inventors: Alexander Willem Gerrese, San Francisco, CA (US); Aakanksha Mirdha, San Francisco, CA (US); Yifei Zhang, San Francisco, CA (US); Jeremy Stephen Juel, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 219 days.

(21) Appl. No.: 17/074,785

(22) Filed: Oct. 20, 2020

(65) Prior Publication Data

US 2022/0120569 A1 Apr. 21, 2022

(51) Int. Cl.
| | | |
|---|---|---|
| G01C 21/34 | (2006.01) | |
| G08G 1/00 | (2006.01) | |
| B60L 53/66 | (2019.01) | |
| G06Q 10/02 | (2012.01) | |
| G06Q 50/30 | (2012.01) | |
| G06Q 10/047 | (2023.01) | |

(52) U.S. Cl.
CPC ............ *G01C 21/343* (2013.01); *B60L 53/66* (2019.02); *G01C 21/3438* (2013.01); *G01C 21/3446* (2013.01); *G01C 21/3461* (2013.01); *G01C 21/3469* (2013.01); *G06Q 10/02* (2013.01); *G06Q 50/30* (2013.01); *G08G 1/202* (2013.01); *G06Q 10/047* (2013.01); *Y02T 90/167* (2013.01)

(58) Field of Classification Search
CPC ..................................................... G06Q 50/30
See application file for complete search history.

(56) References Cited

U.S. PATENT DOCUMENTS

| | | | |
|---|---|---|---|
| 2013/0046457 A1* | 2/2013 | Pettersson .............. | G01C 21/34 701/1 |
| 2017/0120906 A1* | 5/2017 | Penilla .................. | G06Q 20/308 |
| 2017/0262790 A1* | 9/2017 | Khasis ................... | G08G 1/012 |
| 2018/0211541 A1* | 7/2018 | Rakah .................... | G08G 1/148 |
| 2018/0350022 A1* | 12/2018 | Stefan ................ | G01C 21/3438 |
| 2019/0016312 A1* | 1/2019 | Carlson ................ | G05D 1/0088 |
| 2019/0122561 A1* | 4/2019 | Shimizu ............ | G01C 21/3469 |
| 2019/0219411 A1* | 7/2019 | Christen .............. | G01C 21/343 |
| 2020/0117204 A1* | 4/2020 | Lindemann ....... | B60W 60/0023 |
| 2020/0182635 A1* | 6/2020 | Zender ............... | G01C 21/3679 |
| 2020/0286034 A1* | 9/2020 | Ur ....................... | G01C 21/3423 |

* cited by examiner

*Primary Examiner* — Angela Y Ortiz
*Assistant Examiner* — Aaron K McCullers
(74) *Attorney, Agent, or Firm* — Akona IP PC

(57) ABSTRACT

Systems and methods are provided for long distance trips in an autonomous vehicle fleet. In particular, systems and methods are provided for autonomous vehicle trips that are a longer distance than a vehicle can travel without recharging. In some implementations, a user is provided an option between stopping to recharge the autonomous vehicle and switching from a first autonomous vehicle to a second autonomous vehicle at a selected stopping location.

20 Claims, 7 Drawing Sheets

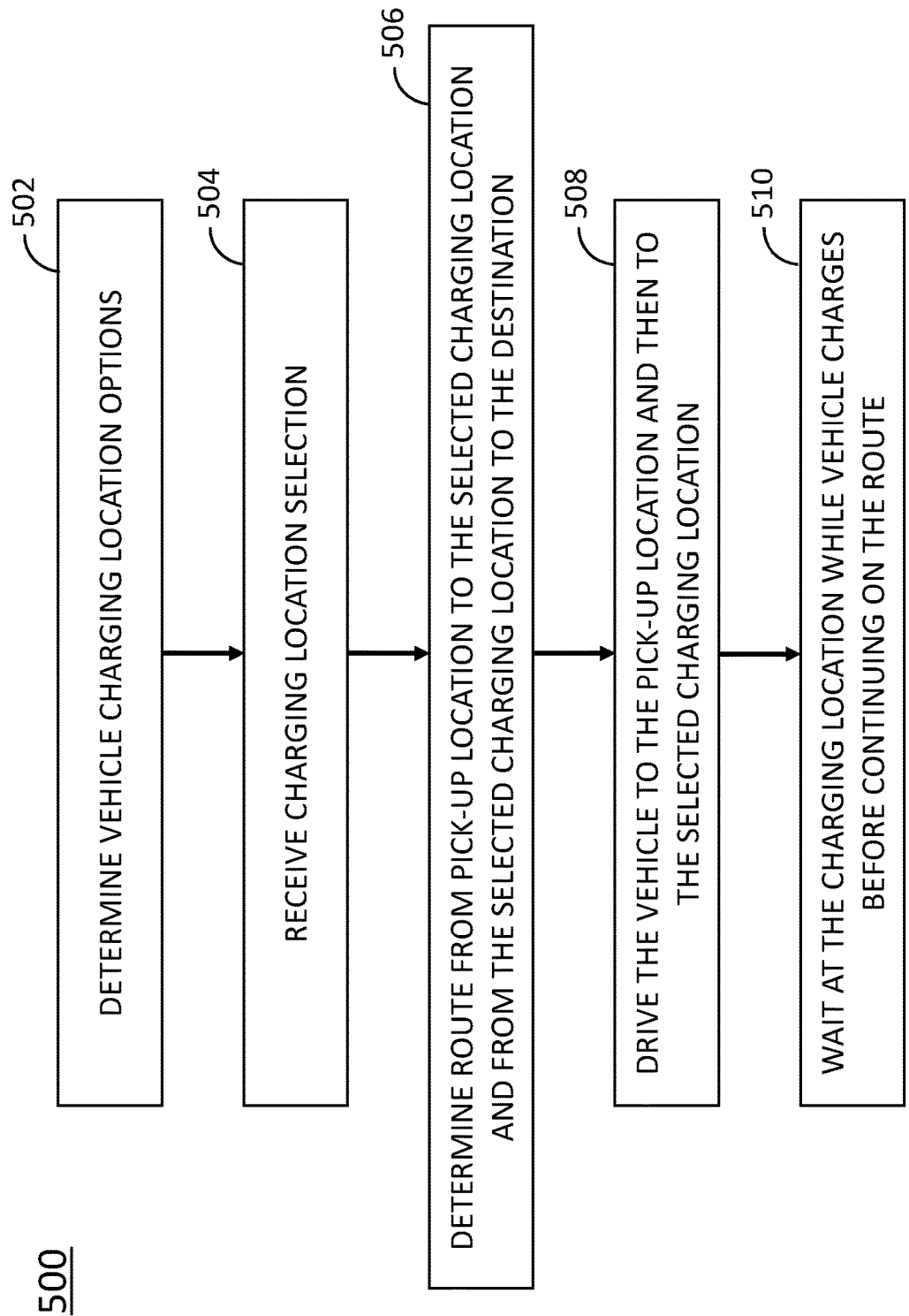

AUTONOMOUS VEHICLE LONG DISTANCE RIDES

FIELD OF THE DISCLOSURE

The present disclosure relates generally to electric vehicles and to systems and methods for long distance trips.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles are generally battery-powered, and there is a maximum distance a vehicle can travel before recharging. Some passenger trip requests include destinations that are farther from the pick-up location than an electric vehicle can travel without recharging.

SUMMARY

Systems and methods are provided for long distance trips in an autonomous vehicle fleet. In particular, systems and methods are provided for autonomous vehicle trips that are a longer distance than a vehicle can travel without recharging. In some implementations, systems and methods are provided for giving a user an option between stopping to recharge the autonomous vehicle and switching from a first autonomous vehicle to a second autonomous vehicle at a selected stopping location. Long-distance trips can include trips from a rural area into a city, from a city to a rural area, from one city to another, multi-city campaign trails, and road trips. In one example, long distance trips cross state lines.

According to one aspect, a method for long distance rides in a fleet of autonomous vehicles, includes receiving a route request including a pick-up location and a destination; assigning the route request to a first autonomous vehicle; determining that a first autonomous vehicle has insufficient charge to complete the route request; determining a waypoint for at least one of: recharging the first autonomous vehicle, and assigning a second portion of the route request to a second autonomous vehicle.

According to another aspect, a system for long distance rides in a vehicle fleet includes a fleet of autonomous vehicles including a first autonomous vehicle and a second autonomous vehicle; and a central computing system including a routing coordinator configured to: receive a route request including pick-up location and a destination, determine that the first autonomous vehicle has insufficient charge to complete the route request; identify a waypoint for at least one of: recharging the first autonomous vehicle, and assigning a portion of the route request to the second autonomous vehicle.

According to another aspect, a method for coordinating multiple vehicles for long distance rides includes receiving a route request at a routing coordinator, including a pick-up location and a destination, wherein the routing coordinator coordinates a fleet of autonomous vehicles; determining that a distance associated with the route request is further than an autonomous vehicle of the fleet of autonomous vehicles can drive without recharging; providing a user interface for the route request for selection between pausing a ride for a selected period of time to recharge a vehicle battery and switching to a second autonomous vehicle; determining a plurality of waypoints for one of the pausing the ride and switching to a second autonomous vehicle; and providing a user interface for selection of one of the plurality of waypoints.

According to various implementations, systems and methods include selecting vehicles with a full battery charge for long distance trips, swapping out autonomous vehicles at a waypoint when charge is low, and providing charging stations mid-trip.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which:

FIG. 5 is a flow chart illustrating a price-optimized method for long distance rides for an autonomous vehicle, according to some embodiments of the disclosure;

DETAILED DESCRIPTION

Overview

Figure 1:
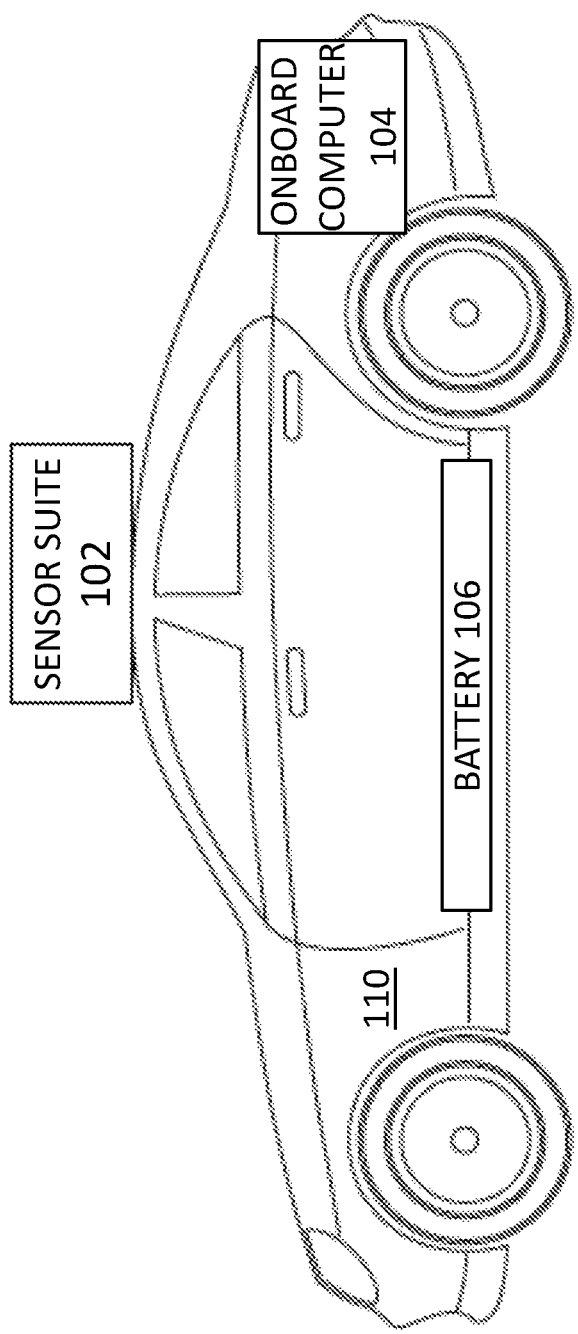
FIG. 1 is a diagram illustrating an autonomous vehicle, according to some embodiments of the disclosure.

Systems and methods are provided for autonomous vehicle long distance trips. In particular, systems and methods are provided for autonomous vehicle trips that are a longer distance than an available vehicle can travel without recharging. In some implementations, systems and method are provided for giving a user an option between stopping to recharge the autonomous vehicle and switching from a first autonomous vehicle to a second autonomous vehicle at a selected stopping location.

In some examples, long distance trips are trips that exceed the distance an autonomous vehicle can travel on about 75% charge. In some examples, long-distance trips include trips that are further than 100 miles. In some examples, long-distance trips include trips that take about 45 minutes or longer. Long-distance trips can include trips from a rural area into a city, from a city to a rural area, from one city to another, multi-city campaign trails, and road trips. In one example, long distance trips cross state lines.

Current rideshare systems, in which a driver must drive the car, disincentivize long-distance trips. Long-distance trips are generally very expensive and therefore not monetarily viable. Additionally, the driver has to drive back after the trip, so a 2-hour trip becomes a 4-hour drive for the driver. Some drivers don't want to drive to unfamiliar areas, and many drivers have other commitments and appointments that prevent taking on a 4-hour trip. Thus, most drivers refuse long distance trips.

For long distance trips, passengers currently use personal vehicles, busses, trains, and planes for long distance trips. While busses, trains, and airplanes can be cost-effective for long distances, there are downsides to these modes of transportation. Some downsides include limited destination choices, such as transportation hubs like bus stops, train stations, and airports, and no possibility of selecting intermediate stops. A rideshare service is often needed for transportation from a pick-up location to the transportation hub and/or from the transportation hub to the destination. Other downsides include time-consuming planning and preparation, security lines, and extra stops along the way. Additionally, public transportation lacks comfort and intimacy, as well as the road trip experience.

Many people do not own personal vehicles, and as rideshare services become more widespread, many more people may choose not to own personal vehicles. Thus, these people are left with undesirable options for long-distance trips. Systems and methods are provided herein for increasing long-distance mobility of autonomous vehicles while increasing utilization and keeping prices affordable. In particular, rideshare systems using the proposed system and methods allow passengers to select destinations that are long distances from the pick-up location.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle Configured for Long Distance Trips

FIG. 1 is a diagram 100 illustrating an autonomous vehicle 110, according to some embodiments of the disclosure. The autonomous vehicle 110 includes a sensor suite 102, an onboard computer 104, and a battery 106. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 is an electric vehicle that operates on battery power.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In various examples, data from the sensor suite can be used to update a map with information used to develop layers with waypoints identifying selected events, the locations of the encountered events, and the frequency with which the events are encountered at the identified location. In this way, sensor suite 102 data from many autonomous vehicles can continually provide feedback to the mapping system and the high fidelity map can be updated as more and more information is gathered.

The sensor suite 102 includes a plurality of sensors, and is coupled to the onboard computer 104, and the battery 106. In some examples, the onboard computer 104 receives data captured by the sensor suite 102 and utilizes the data received from the sensors suite 102 in controlling operation of the autonomous vehicle 110. In some examples, one or more sensors in the sensor suite 102 are coupled to the battery 106, and capture information regarding a state of charge of the battery 106 and/or a state of health of the battery 106.

In various examples, the battery 106 includes multiple batteries and/or battery cells. The batteries and/or battery cells may be coupled together. In some examples, the batteries 106 include a high voltage (HV) battery and one or more low voltage (LV) batteries. The batteries 106 are used for operation of the autonomous vehicle, for example to power the vehicle and to start the vehicle. In some implementations, the autonomous vehicle is an electric vehicle, and the batteries 106 provide power for movement of the vehicle among other operations of the vehicle. Furthermore, the battery 106 powers components of the autonomous vehicle including the sensor suite 102 and the onboard computer 104.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Based upon the vehicle state and programmed instructions, the onboard computer 104 controls and/or modifies driving behavior of the autonomous vehicle 110.

In some implementations, the onboard computer 104 receives indications of the state of charge and/or state of health of the battery 106 and determines operations to be performed by the autonomous vehicle 110 based on the state of the battery 106. For example, the onboard computer 110 may determine the level of charge of the battery 106, and the onboard computer 110 may determine that the battery 106 needs to be charged. In some implementations, based on a determined state of charge and/or state of health of the batteries 106, the onboard computer 110 may perform operations to address a condition of the battery 106, such as causing the vehicle 106 to proceed to a charging station for charging the battery 106 and causing charging of the battery 106 to be stopped in response to determining the battery 106 has been charged to a selected level of charge. In various implementations, the computer determines a state-of-charge of the battery 106 based on a voltage of the battery 106, a current drawn from the battery 106, temperature of the battery 106, other data related to the battery 106, and/or a combination thereof.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Long Distance Rides

Figure 2:
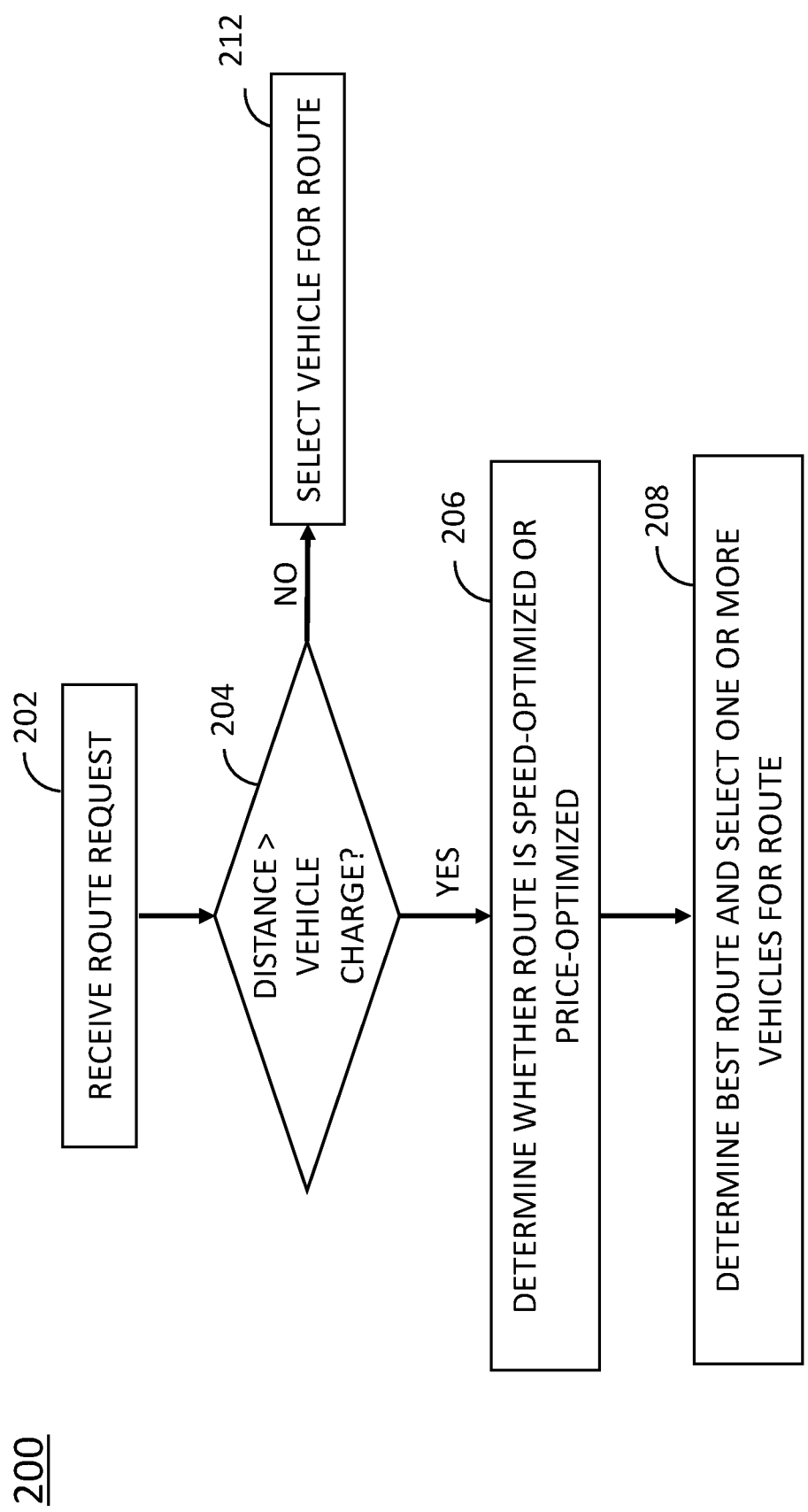
FIG. 2 is a diagram illustrating a method for long distance rides for an autonomous vehicle, according to some embodiments of the disclosure.

FIG. 2 is a diagram illustrating a method for long distance rides for an autonomous vehicle, according to some embodiments of the disclosure. At step 202, a route request is received. In various examples, the route request is received at a central computer for a fleet of autonomous vehicles. At step 204, the route request is evaluated to determine if the distance of the route is greater than the distance an available autonomous vehicle can drive in a single charge. In various examples, the distance includes the distance the autonomous vehicle drives from a charging station to a pick-up location. The distance may be based on battery charge level of currently available autonomous vehicles. In some examples, the vehicle charge distance is a pre-determined distance. In one example, the vehicle charge distance is about 250 miles. In some examples, the vehicle charge distance depends on the route, including route parameters that can affect battery usage such as city-driving vs highway driving. At step 204, if the distance is less than vehicle charge distance, the method 200 proceeds to step 212 and selects an available vehicle for the requested route. If the distance is greater than vehicle charge distance, the method 200 proceeds to step 206.

At step 206, it is determined whether the requested route is to be speed-optimized or price-optimized. In some examples, after a user submits a route request, the user is presented with the option of stopping for a selected period of time to recharge the vehicle (price-optimized), or making a quick stop to switch to another vehicle that has a charged battery (speed-optimized). With either selection, the user may be given multiple general route options (e.g., different highways), with associated times and prices. Once the user selects a route, at step 208, the best route is determined, and one or more vehicles is selected for the route.

Example of Autonomous Vehicle Fleet

Figure 3:
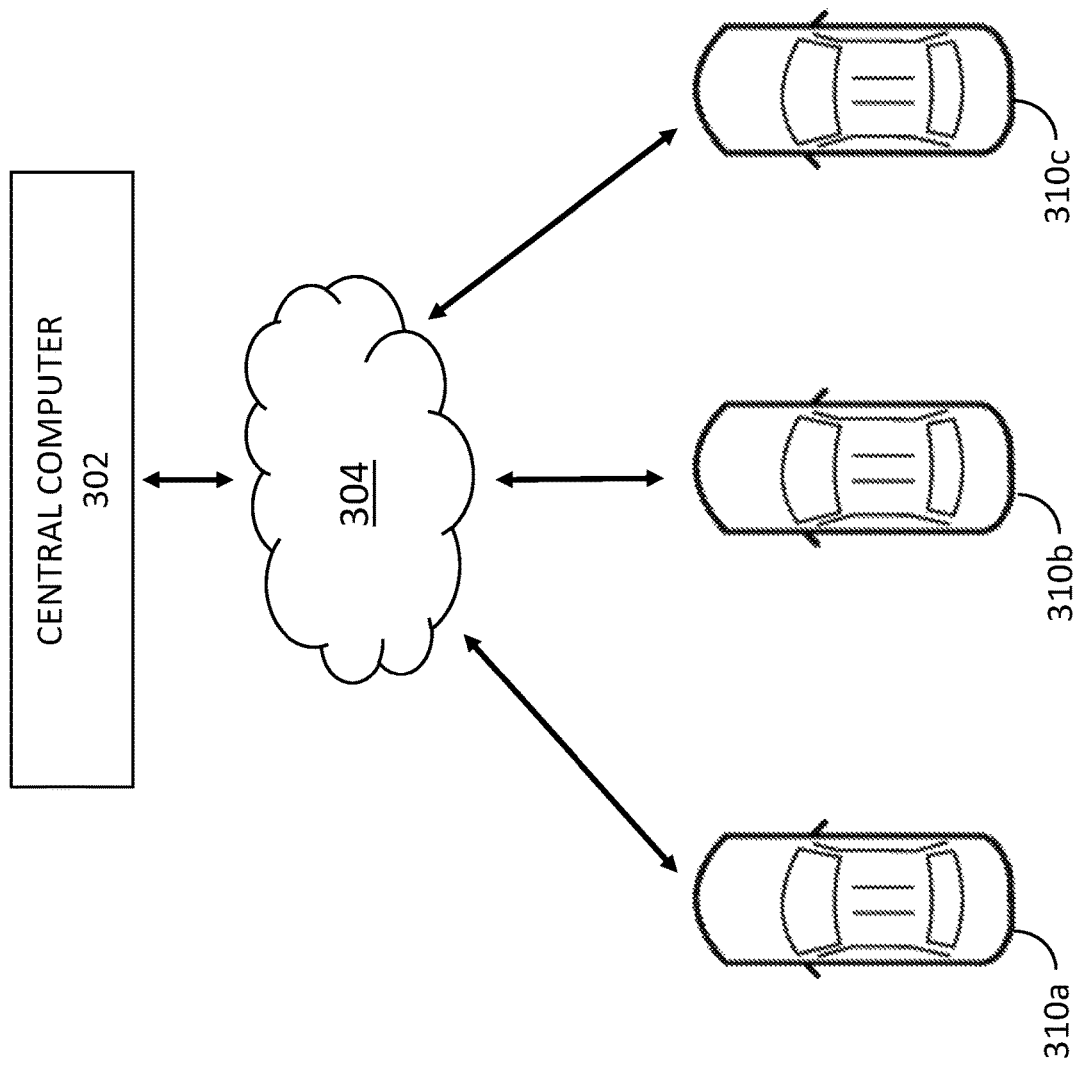
FIG. 3 is a diagram illustrating a fleet of autonomous vehicles in communication with a central computer, according to some embodiments of the disclosure.

FIG. 3 is a diagram 300 illustrating a fleet of autonomous vehicles 310a, 310b, 310c in communication with a central computer 302, according to some embodiments of the disclosure. According to various implementations, the fleet of vehicles 310a, 310b, 310c as well as the cloud 304 and central computer 302 implement long distance ride requests. As shown in FIG. 3, the vehicles 310a-310c communicate wirelessly with a cloud 304 and a central computer 302. The central computer 302 includes a routing coordinator and a database of information from the vehicles 310a-310c in the fleet. Autonomous vehicle fleet routing refers to the routing of multiple vehicles in a fleet. In some implementations, autonomous vehicles communicate directly with each other.

When a ride request is received from a passenger, the routing coordinator selects an autonomous vehicle 310a-310c to fulfill the ride request, and generates a route for the autonomous vehicle 310a-310c. As described herein, in some examples, the routing coordinator selects more than one autonomous vehicle 310a-310c to fulfill the ride request. The generated route includes a route from the autonomous vehicle's present location to the pick-up location, and a route from the pick-up location to the final destination. In some examples, the generated route includes a route from the pick-up location to a selected waypoint, and a route from the selected waypoint to the final destination. In some examples, a first autonomous vehicle 310a drives the route to the waypoint and a second autonomous vehicle 310b drives the route from the waypoint to the final destination. In various examples, the route includes multiple waypoints and multiple autonomous vehicles. In some implementations, the central computer 302 communicates with a second fleet of autonomous vehicles, and a vehicle from the second fleet of autonomous vehicles drives the route from the waypoint to the final destination.

Each vehicle 310a-310c in the fleet of vehicles communicates with a routing coordinator. Information gathered by various autonomous vehicles 310a-310c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals.

In some examples, in addition to selecting between a route with a charging stop and a route performed by two or more autonomous vehicles, passengers are given other route selection options. In some examples, a user can select the route to take (e.g., a scenic route, an ocean-view route, a freeway route, a toll road, etc.). In some examples, if the user chooses to wait while the first autonomous vehicle charges, the user can select a drop-off location close to the charging station. Examples of drop-off location include restaurants, shopping centers, playgrounds, beaches, etc. The vehicle drops off the passenger at the drop-off location, drives to a charging station for a quick charge, and then returns to pick-up the passenger after a selected time period.

In various implementations, the central computer 302 is connected to a database with vehicle charger information. The database includes locations of vehicle charges within the operating area of the fleet. Additionally, the charger station database includes information about whether any particular charging station is in use, how long it has been in use, and when it is expected to be vacated and available for use by other vehicles. In various examples, the charging station database includes charging stations designed specifically for use by the fleet as well as charging stations provided by others. The central computer 302 provides charging station information to the routing coordinator, which uses the information in selecting routes in long distance rides. In some examples, the routing coordinator reserves a charging station for an autonomous vehicle to use at a specific time, or for a specific time window. In some examples, an autonomous vehicle uses a rapid charge feature to charge its battery to over 50% in half an hour. In some examples, the autonomous vehicle uses a rapid charge feature to charge its battery to about 80% in about half an hour.

According to various implementations, a set of parameters can be established that determine which metrics are considered (and to what extent) in determining routes or route modifications. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints. In some examples, the routing goal includes user preference (e.g., scenic route).

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger). For long-distance rides, in which a single autonomous vehicle cannot drive the entire distance without recharging, a routing goal may be to optimize speed, in which case a second (charged) vehicle meets the first vehicle at a waypoint, and the passenger switches vehicles.

The routing coordinator uses maps to select an autonomous vehicle from the fleet to fulfill a ride request. In some implementations, the routing coordinator sends the selected autonomous vehicle the ride request details, including pick-up location and destination, and an onboard computer on the selected autonomous vehicle generates a route and navigates to the destination. In some examples, the routing coordinator also sends the selected vehicle one or more stops, including a charging station stop, for the autonomous vehicle to recharge. In some examples, the routing coordinator sends a first vehicle the pick-up location and a waypoint location, and the routing coordinator sends a second vehicle the waypoint location and the destination location, such that the passenger switches vehicles mid-ride. In some implementations, the routing coordinator in the central computing system 302 generates a route for each selected autonomous vehicle 310a-310c, and the routing coordinator determines a route for the autonomous vehicle 310a-310c to travel from the autonomous vehicle's current location to a first stop.

In some examples, there is a waypoint between the pick-up location and the destination where several autonomous vehicles are available. For example, if a previous long-distance ride included a vehicle switch at the waypoint, the first vehicle can remain at the waypoint, fully charged, and available as a second vehicle for another long distance ride. In some examples, the waypoint is a hub for a subset of vehicles for vehicle swaps during long distance rides.

In some examples, a user can reserve a ride ahead of time. In one example, if a user reserves a long distance ride, the routing coordinator can make sure the user receives a fully charged vehicle for the first leg of the ride.

In one example, a first set of autonomous vehicles operates in a first city and a second set of autonomous vehicles operates in a second city. When the user requests a long distance ride from the first city to the second city, a first autonomous vehicle drives the user to the second city, and, rather than drive back to the first city without a passenger, the first autonomous vehicle is integrated into the second set of autonomous vehicles in the second city. Over time, this can cause an imbalance in the first and second sets of autonomous vehicles. In particular, either the first or second city has fewer vehicles than it needs to optimally fulfill its route requests, while the other city has more vehicles than it needs to optimally fulfill its route requests.

In some implementations, the central computer 302 flags an imbalance in the first and second sets of autonomous vehicles, and one or more methods for rebalancing the fleet are initiated. In one example, the first set of vehicles in the first city has too few vehicles and the second set of vehicles in the second city has too many vehicles. One method for rebalancing the fleet is to promote road trips from the second city to the first city, for example with advertisements. Another method is to offer incentives to users to request autonomous vehicle routes from the second city to the first city. Incentives may include low prices on these rides, as well as rebates or coupons for activities, stores, and/or restaurants along the way (e.g., near charging station locations). In another method for rebalancing the fleet, vehicles that travel a certain distance toward the first city (perhaps crossing a selected threshold) are reassigned to the first set of vehicles. In another example, incentives are provided for sharing rides with other users to rebalance the fleet.

In some implementations, the fleet of autonomous vehicles includes three or more sets of vehicles in three or more cities. In one example, a smaller third city between the first and second cities has a third set of autonomous vehicles. One method for rebalancing the fleet, in the example in which the first set of vehicles has too few vehicles and the second set of vehicles has too many vehicles, is to transfer vehicles from the second set that travel towards the third city to the third set of vehicles, and to transfer vehicles from the third set of vehicles that travel towards the first city to the first set of vehicles. In this manner, vehicles can be shifted among markets to rebalance the fleet.

In some examples, the fee charged for the long distance ride depends on various user choices as well as fleet-level goals. For example, if a user chooses a speed-optimized route, requesting that a second vehicle be available at a waypoint such that the user does not have to wait for the first vehicle to charge, the user may be charged extra for this service. In contrast, if a user chooses a route including a charging waypoint, during which the user waits for the vehicle to charge, the user may be charged a smaller overall fee. Fees may also vary due to incentives, for example to rebalance the fleet as described above. In some examples, a user may select a night-time ride, and since the electricity for recharging the vehicle is less expensive at night, this can reduce the fee for the ride. In some examples, an autonomous vehicle can recharge autonomously, allowing a night-time rider to sleep through the ride. In other examples, a user and/or passenger plugs in the vehicle for recharging. Additionally, selecting a ride at an off-peak time period can be less expensive than a ride during an on-peak time period.

Example Speed-Optimized Method for Long-Distance Routes

Figure 4:
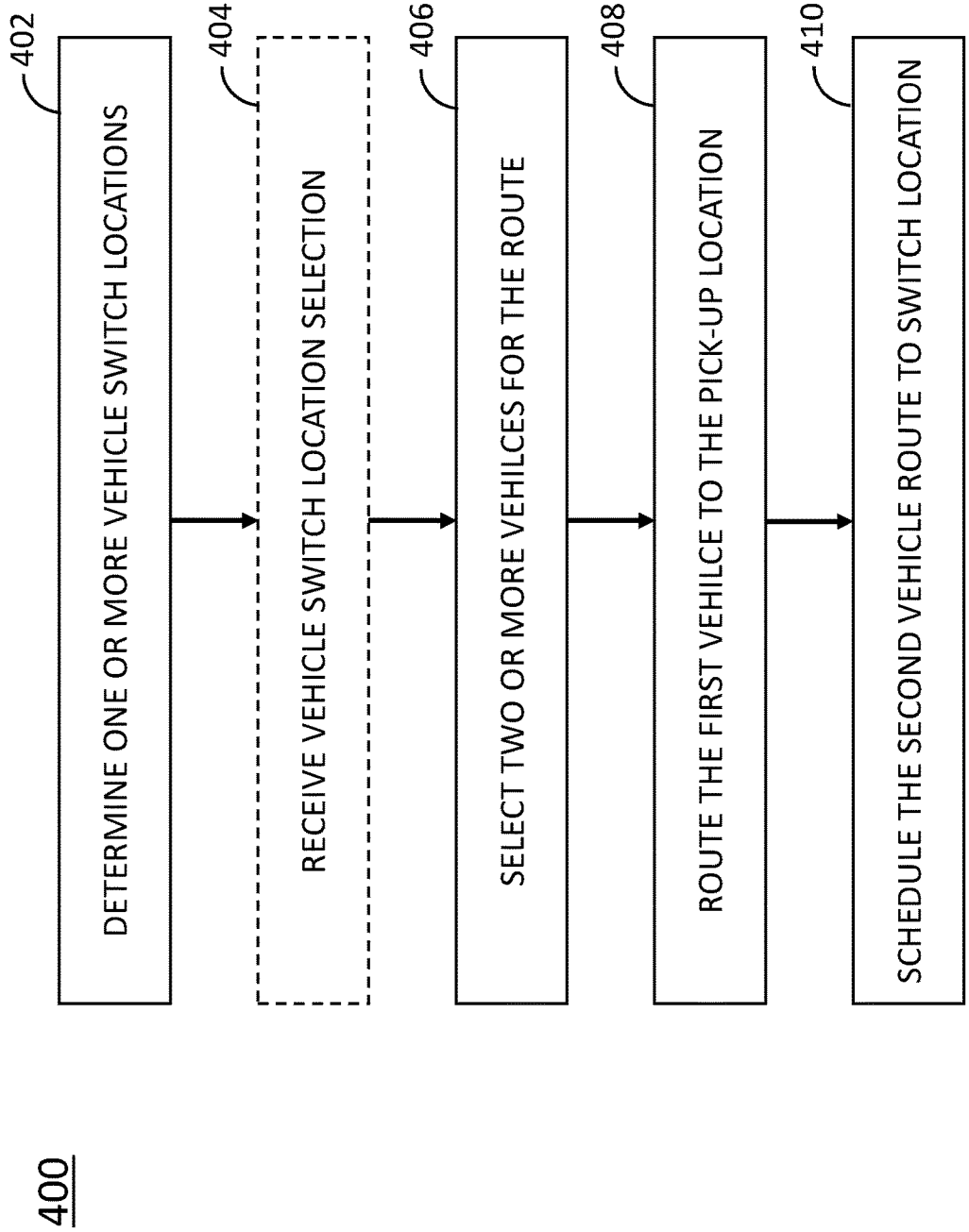
FIG. 4 is a flow chart illustrating a speed-optimized method for long distance rides for an autonomous vehicle, according to some embodiments of the disclosure.

FIG. 4 is a diagram illustrating a speed-optimized method 400 for a long distance ride for an autonomous vehicle, according to some embodiments of the disclosure. As described above, after a route request is received, and it is determined that the distance is greater than can be travelled by an autonomous vehicle on a single charge, the routing coordinator will designate a waypoint for the first autonomous vehicle to stop. At the waypoint, the first autonomous vehicle recharges, and the user can either wait for the autonomous vehicle to recharge, or continue the ride in a second vehicle. The speed-optimized method for long distance rides includes rides for which the user chooses not to wait for recharging. The method 400 begins after the user has selected a speed-optimized route. Thus, at step 402, one or more vehicle switch locations are determined. In some examples the vehicle switch location(s) are pre-determined by the routing coordinator. In other examples, the user is presented with several potential switch locations, and at optional step 404, user-selected vehicle switch locations are received.

At step 406, the routing coordinator selects two or more vehicles for the route. The routing coordinator selects a first autonomous vehicle having sufficient battery charge to reach the first switch location. The routing coordinator selects a second autonomous vehicle such that it can be waiting at the switch location with sufficient charge for the next leg of the journey. In some examples, the second autonomous vehicle is already waiting at the switch location. In some examples, the second autonomous vehicle travels to the switch location, arriving before the first autonomous vehicle. In some examples, the second autonomous vehicle recharges at the switch location before the first autonomous vehicle arrives.

At step 408, the routing coordinator routes the first autonomous vehicle travels to the pick-up location. The first autonomous vehicle then drives to the first vehicle switch location. At step 410, the routing coordinator schedules the second autonomous vehicle route to the switch location. In some examples, the second autonomous vehicle continues to perform other rides while the first autonomous vehicle drives to the switch location. The second autonomous vehicle is scheduled to arrive at the switch location before the first autonomous vehicle, with enough charge to drive to a second destination. The second autonomous vehicle may recharge at the switch location before the first autonomous vehicle arrives. In some examples, the second destination is the final route destination location, and in some examples, the second destination is a second switch location.

According to various implementations, a passenger can request additional stops while enroute between the pick-up location and the destination location. In some examples, additional stops are added before the ride begins. In other examples, extra stops are added during the ride. In one example, the user requests a bathroom stop. In another example, the user requests a food and/or beverage stop.

Example Price-Optimized Method for Long-Distance Routes

FIG. 5 is a flow chart illustrating a price-optimized method 500 for a long distance ride for an autonomous vehicle, according to some embodiments of the disclosure. The method 500 begins after the user has selected a price-optimized route. Thus, at step 502, one or more vehicle charging locations is determined. In some examples the vehicle charging location(s) are pre-determined by the routing coordinator. In other examples, the user is presented with several potential charging location options, and at optional step 504, user-selected vehicle charging locations are received. In various examples, the user can select a stop at a specific location or type of location, such as at a restaurant, shopping center, park, or other location. In some examples, the autonomous vehicle drops off the user at a selected location, drives to a charging station for recharging, and picks up the user at the selected location again following charging.

At step 506, the routing coordinator determines a route from the pick-up location to the selected charging location, and from the charging location to the destination. The routing coordinator selects an autonomous vehicle having sufficient battery charge to reach the first charging location. In some examples, a user reserves the ride ahead of time, and the routing coordinator schedules a vehicle to have a full charge at pick-up.

At step 508, the routing coordinator provides a route to an autonomous vehicle to travel to the pick-up location and then on to the selected charging station. The autonomous vehicle proceeds to drive to the pick-up location. In some examples, the autonomous vehicle makes an intermediate stop close to the charging station to drop off the users while the vehicle charges. At step 510, the autonomous vehicle charges at the charging station, while the passenger waits either at the charging station or somewhere nearby (such as a nearby intermediate stop). In some examples, the passenger waits in the vehicle while it charges. In other examples, the passenger exits the vehicle at the charging station and goes to a nearby location. Following recharging, the passenger re-enters the vehicle (if the passenger exited the vehicle), and autonomous vehicle proceeds on the route toward the final destination. In some implementations, the autonomous vehicle stops at a second charging location before arriving at the final destination.

Example of a Long-Distance Route Interface

Figures 6A, 6B:
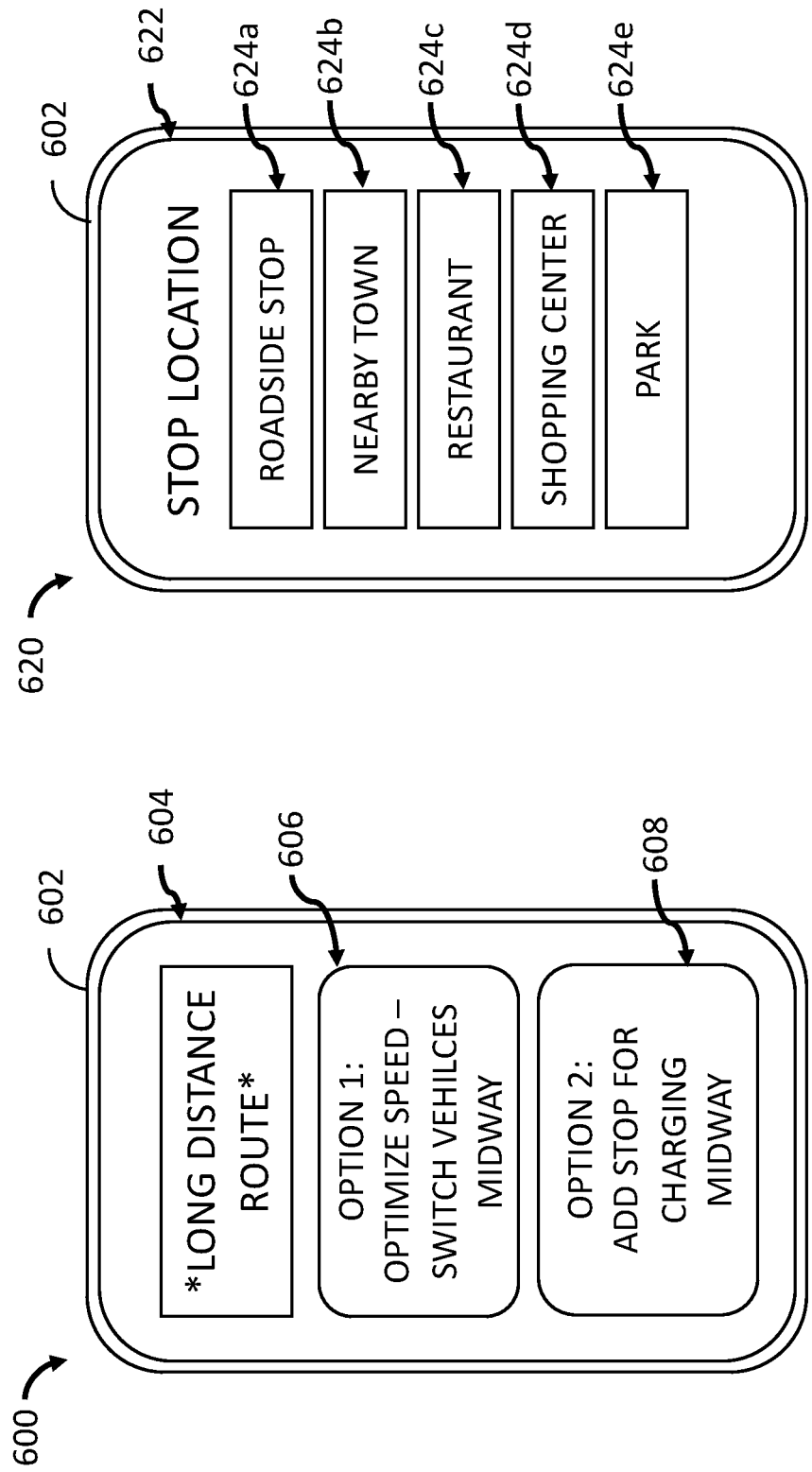
FIGS. 6A-6B show examples of an interface for requesting long distance autonomous vehicle routes, according to some embodiments of the disclosure.

FIGS. 6A-6B show examples 600, 620 of an interface for requesting long distance autonomous vehicle routes, according to some embodiments of the disclosure. FIG. 6A shows an example 600 of a device 602 showing an interface 604 and two selection buttons 606 and 608. In particular, the interface 604 is displayed after a user has entered the desired route. The interface 604 informs the user that the requested route is a long distance route, and allows the user to select between a speed-optimized route (button 606) and a price-optimized route (button 608). In particular, if a user selects option 1 (button 606), the user agrees to switch vehicles midway at a switch location. As described above, the user may still be given an option for switch locations on a next screen. In other examples, the routing coordinator determines the fastest route, including the switch location.

If a user selects option 2 (button 608), the user acknowledges that the ride will include a stop to charge the vehicle. In various implementations, the user can choose the stop location, as shown in the interface 622 in FIG. 6B. In particular, FIG. 6B shows several stop location options, including a roadside stop 624a, a nearby town 624b, a restaurant 624c, a shopping center 624d, and a park 624e. The options presented in interface 622 can vary depending on the route. The routing coordinator ensures that all options presented on the interface 622 are options for the particular requested route. In some examples, the various options include different approximate stop times and/or total detour times (including vehicle charging time), and the additional time to be added to the route is included with each option. Additionally, in some examples, some options add an additional fee to the total ride cost, and any additional fee is included on the interface 622 with each option.

Example of a Computing System for Ride Requests

Figure 7:
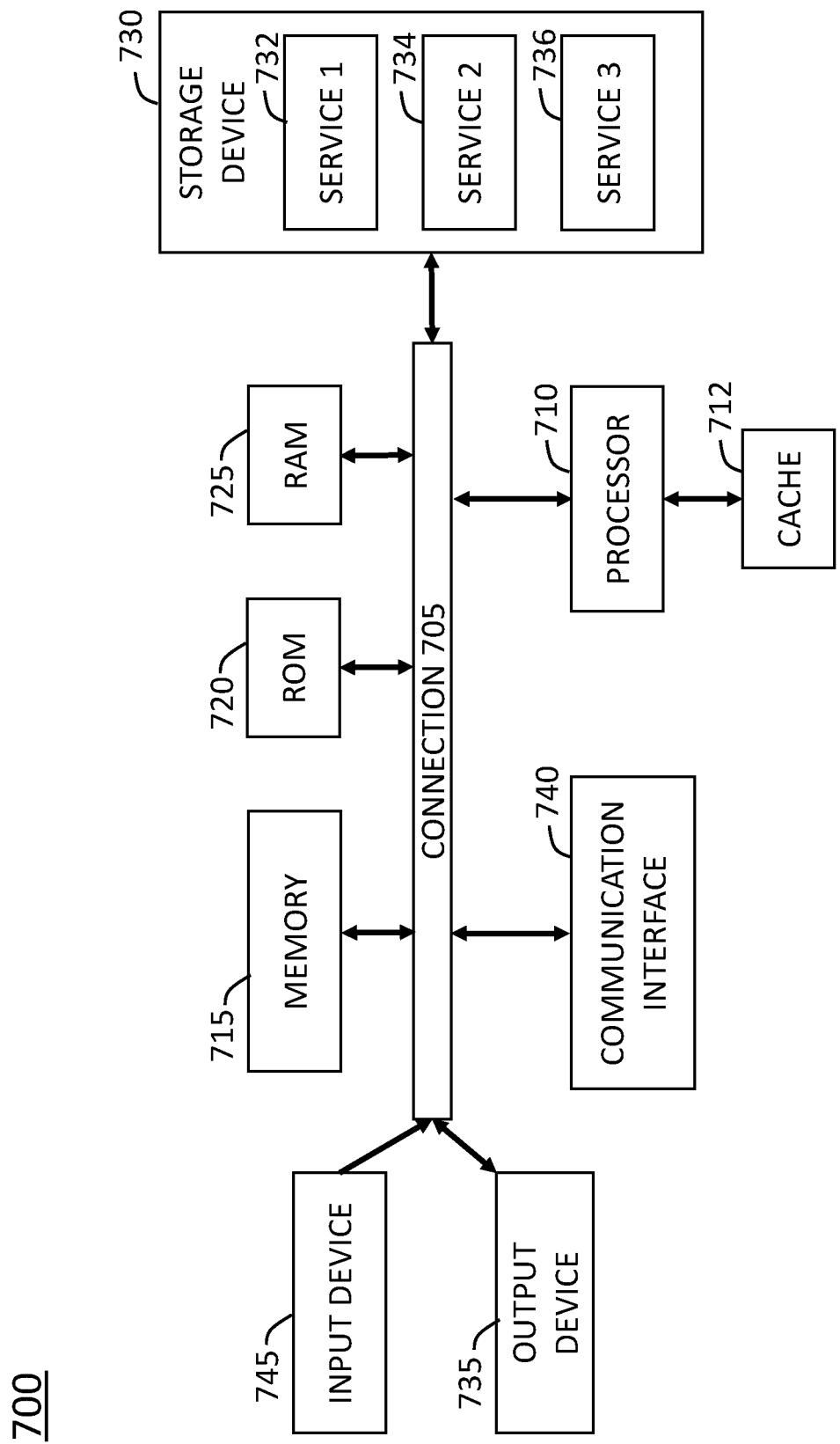
FIG. 7 shows an example embodiment of a system for implementing certain aspects of the present technology.

FIG. 7 shows an example embodiment of a computing system 700 for implementing certain aspects of the present technology. In various examples, the computing system 700 can be any computing device making up the onboard computer 104, the central computing system 302, or any other computing system described herein. The computing system 700 can include any component of a computing system described herein which the components of the system are in communication with each other using connection 705. The connection 705 can be a physical connection via a bus, or a direct connection into processor 710, such as in a chipset architecture. The connection 705 can also be a virtual connection, networked connection, or logical connection.

In some implementations, the computing system 700 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 700 includes at least one processing unit (CPU or processor) 710 and a connection 705 that couples various system components including system memory 715, such as read-only memory (ROM) 720 and random access memory (RAM) 725 to processor 710. The computing system 700 can include a cache of high-speed memory 712 connected directly with, in close proximity to, or integrated as part of the processor 710.

The processor 710 can include any general-purpose processor and a hardware service or software service, such as services 732, 734, and 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction, the computing system 700 includes an input device 745, which can represent any number of input mechanisms, such as a microphone for speech, a touch-sensitive screen for gesture or graphical input, keyboard, mouse, motion input, speech, etc. The computing system 700 can also include an output device 735, which can be one or more of a number of output mechanisms known to those of skill in the art. In some instances, multimodal systems can enable a user to provide multiple types of input/output to communicate with the computing system 700. The computing system 700 can include a communications interface 740, which can generally govern and manage the user input and system output. There is no restriction on operating on any particular hardware arrangement, and therefore the basic features here may easily be substituted for improved hardware or firmware arrangements as they are developed.

A storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as a processor 710, a connection 705, an output device 735, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for long distance rides in a fleet of autonomous vehicles, comprising: receiving a route request including a pick-up location and a destination; assigning the route request to a first autonomous vehicle; determining that a first autonomous vehicle has insufficient charge to complete the route request; determining a waypoint for at least one of: recharging the first autonomous vehicle, and assigning a second portion of the route request to a second autonomous vehicle.

Example 2 provides a method according to one or more of the preceding and/or following examples, further comprising selecting the first and second autonomous vehicles from the fleet of autonomous vehicles, and determining a first route for the first autonomous vehicle to the pick-up location and from the pick-up location to the waypoint.

Example 3 provides a method according to one or more of the preceding and/or following examples, further comprising determining a second route for the second autonomous vehicle from the waypoint to the destination.

Example 4 provides a method according to one or more of the preceding and/or following examples, further comprising determining a third route for the second autonomous vehicle to the waypoint.

Example 5 provides a method according to one or more of the preceding and/or following examples, further comprising ensuring the second autonomous vehicle has sufficient charge for the second route.

Example 6 provides a method according to one or more of the preceding and/or following examples, further comprising charging the second autonomous vehicle at the waypoint.

Example 7 provides a method according to one or more of the preceding and/or following examples, further comprising identifying a plurality of waypoint locations, and receiving a selection from the plurality of waypoint locations, wherein the selection is used to determine the waypoint.

Example 8 provides a system for long distance rides in a vehicle fleet, comprising: a fleet of autonomous vehicles including a first autonomous vehicle and a second autonomous vehicle; and a central computing system including a routing coordinator configured to: receive a route request including pick-up location and a destination, determine that the first autonomous vehicle has insufficient charge to complete the route request; identify a waypoint for at least one of: recharging the first autonomous vehicle, and assigning a portion of the route request to the second autonomous vehicle.

Example 9 provides a system according to one or more of the preceding and/or following examples, wherein the central computing system is further configured to provide a user interface for selection between: pausing a ride at the waypoint while the first autonomous vehicle charges and continuing the route request with the first autonomous vehicle, and switching, at the waypoint, to the second autonomous vehicle for the portion of the route request.

Example 10 provides a system according to one or more of the preceding and/or following examples, wherein the routing coordinator is further configured to: select the first and second autonomous vehicles from the autonomous vehicle fleet, and determine a first route for the first autonomous vehicle to the pick-up location and from the pick-up location to the waypoint.

Example 11 provides a system according to one or more of the preceding and/or following examples, wherein the routing coordinator is further configured to determine a second route for the second autonomous vehicle from the waypoint to the destination.

Example 12 provides a system according to one or more of the preceding and/or following examples, wherein the routing coordinator is further configured to: identify a plurality of waypoint locations, and receive a selection from the plurality of waypoint locations, wherein the selection is used to determine the waypoint.

Example 13 provides a system according to one or more of the preceding and/or following examples, wherein the fleet of autonomous vehicles includes a first set of autonomous vehicles in a first city and a second set of autonomous vehicles in a second city.

Example 14 provides a system according to one or more of the preceding and/or following examples, wherein the routing coordinator is configured to coordinate routes for the first and second sets of vehicles in the first and second cities.

Example 15 provides a system according to one or more of the preceding and/or following examples, wherein the routing coordinator is configured to detect an imbalance in the first and second sets of autonomous vehicles relative to route requests in the first and second cities.

Example 16 provides a system according to one or more of the preceding and/or following examples, wherein the routing coordinator is configured to detect the first set of vehicles is too small and wherein the central computer is configured to provide ride incentives to move vehicles from the second set to the first set.

Example 17 provides a system according to one or more of the preceding and/or following examples, further comprising an onboard computing system on the first autonomous vehicle configured to: receive the route request; drive the first autonomous vehicle to the pick-up location for picking up the passenger; and drive to the selected waypoint.

Example 18 provides a method for coordinating multiple vehicles for long distance rides, comprising: receiving a route request at a routing coordinator, including a pick-up location and a destination, wherein the routing coordinator coordinates a fleet of autonomous vehicles; determining that a distance associated with the route request is further than an autonomous vehicle of the fleet of autonomous vehicles can drive without recharging; providing a user interface for the route request for selection between pausing a ride for a selected period of time to recharge a vehicle battery and switching to a second autonomous vehicle; determining a plurality of waypoints for one of the pausing the ride and switching to a second autonomous vehicle; and providing a user interface for selection of one of the plurality of waypoints.

Example 19 provides a method according to one or more of the preceding and/or following examples, further comprising wherein the user interface for selection of one of the plurality of waypoints includes associated attractions at each of the plurality of waypoints.

Example 20 provides a method according to one or more of the preceding and/or following examples, further comprising receiving a selected waypoint from the plurality of waypoints, and determining a route for a first autonomous vehicle to the pick-up location and from the pick-up location to the waypoint.

VARIATIONS AND IMPLEMENTATIONS

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for long distance rides in a fleet of autonomous vehicles, comprising:
   receiving a route request including a pick-up location and a destination;
   assigning the route request to a first autonomous vehicle;
   determining that the first autonomous vehicle has insufficient charge to complete the route request;
   providing a user interface for the route request for selection between a price-optimization preference and a time-optimization preference, wherein the price-optimization includes pausing a corresponding ride for a selected period of time to recharge the first autonomous vehicle and wherein the time-optimization preference includes switching to a second autonomous vehicle;
   determining that the route request includes the price-optimization preference;
   identifying a plurality of charging station waypoints;
   identifying a plurality of stop locations, each of the plurality of stop locations near at least one of the plurality of charging station waypoints, and wherein the plurality of stop locations each include one of a restaurant, a shopping center, a playground, a park, and a beach;
   providing a ride incentive for routes to a first city in order to rebalance the fleet of autonomous vehicles, wherein providing the ride incentive includes providing, via the user interface, for each of the plurality of stop locations, a coupon for an associated activity at or near the respective stop location;
   receiving a stop location selection for a first stop location of the plurality of stop locations;
   identifying a first charging station waypoint of the plurality of charging station waypoints, wherein the first charging station waypoint corresponds to the stop location selection;
   routing the first autonomous vehicle to the stop location for passenger drop-off;
   routing the first autonomous vehicle from the stop location to the charging station waypoint for recharging;
   charging the first autonomous vehicle at the charging station waypoint;
   routing the first autonomous vehicle from the charging station waypoint back to the stop location for passenger pick-up; and
   routing the first autonomous vehicle to the destination.

2. The method of claim 1, further comprising:
   selecting the first autonomous vehicle from the fleet of autonomous vehicles, and
   determining a first route for the first autonomous vehicle to the pick-up location and from the pick-up location to the stop location.

3. A system for long distance rides in a vehicle fleet, comprising:
   a fleet of autonomous vehicles including a first autonomous vehicle and a second autonomous vehicle; and
   a central computing system including a routing coordinator configured to:
      receive a route request for a passenger ride including pick-up location and a destination;
      determine that a distance associated with the route request is further than an autonomous vehicle of the fleet of autonomous vehicles can drive without recharging;
      provide a user interface for the route request for selection between a price-optimization preference and a time-optimization preference, wherein the price-optimization includes pausing the passenger ride for a selected period of time to recharge a vehicle battery and wherein the time-optimization preference includes switching to a second autonomous vehicle;
receive a user selection to pause the ride for the selected period of time to recharge the vehicle battery;
identify a plurality of charging station waypoints for pausing the ride;
identify a plurality of stop locations, each of the plurality of stop locations near at least one of the plurality of charging station waypoints, wherein the plurality of stop locations include one of a restaurant, a shopping center, a playground, a park, and a beach;
provide a ride incentive for routes to a first city in order to rebalance the fleet of autonomous vehicles, wherein providing the ride incentive includes providing, via the user interface, for each of the plurality of stop locations, a coupon for an associated activity at or near the respective stop location;
receive a user stop location selection including one of the plurality of stop locations;
identify a selected charging station waypoint of the plurality of charging station waypoints, wherein the selected charging station waypoint corresponds to the stop location selection;
identify a first autonomous vehicle from the fleet of autonomous vehicles that has sufficient charge to drive to the pick-up location, from the pick-up location to the selected stop location, and from the stop location to the selected charging station waypoint;
assign the route request to the first autonomous vehicle;
route the first autonomous vehicle to the pick-up location for passenger pick-up;
route the first autonomous vehicle to the stop location for passenger drop-off;
route the first autonomous vehicle from the stop location to the selected charging station waypoint for recharging;
route the first autonomous vehicle back from the selected charging station waypoint to the stop location for passenger pick-up; and
route the first autonomous vehicle to the destination.

4. The system of claim 3, wherein the central computing system is further configured to provide a user interface for selection of the pausing the passenger ride for the selected period of time to recharge and the user stop location.

5. The system of claim 3, wherein the routing coordinator is further configured to:
select the first autonomous vehicle from the autonomous vehicle fleet, and
determine a first route for the first autonomous vehicle to the pick-up location and from the pick-up location to the stop location.

6. The system of claim 5, wherein the routing coordinator is further configured to determine a second route for the first autonomous vehicle from the stop location to the destination.

7. The system of claim 3, wherein the fleet of autonomous vehicles includes a first set of autonomous vehicles in a first city and a second set of autonomous vehicles in a second city.

8. The system of claim 7, wherein the routing coordinator is configured to coordinate routes for the first and second sets of vehicles in the first and second cities.

9. The system of claim 8, wherein the routing coordinator is configured to detect an imbalance in the first and second sets of autonomous vehicles relative to route requests in the first and second cities.

10. The system of claim 9, wherein the routing coordinator is configured to detect the first set of vehicles is too small and wherein the central computer is configured to provide the ride incentive for route to the first city to move vehicles from the second set to the first set.

11. The system of claim 3, further comprising an onboard computing system on the first autonomous vehicle configured to:
receive the route request;
control vehicle driving behavior to drive the first autonomous vehicle to the pick-up location for picking up the passenger;
drive to the selected stop location;
drive to the selected charging station waypoint; and
autonomously connect to a charger to recharge at the selected charging station waypoint.

12. A method for long distance rides, comprising:
receiving a route request at a routing coordinator, including a pick-up location and a destination, wherein the routing coordinator coordinates a fleet of autonomous vehicles;
determining that a distance associated with the route request is further than an autonomous vehicle of the fleet of autonomous vehicles can drive without recharging;
providing a user interface for the route request for selection between a price-optimization preference and a time-optimization preference, wherein the price-optimization includes pausing a ride for a selected period of time to recharge a vehicle battery and switching to a second autonomous vehicle;
receiving a user selection to pause the ride for the selected period of time to recharge the vehicle battery;
determining a plurality of charging station waypoints for pausing the ride;
identifying a plurality of stop locations, each of the plurality of stop locations near at least one of the plurality of charging station waypoints, wherein the plurality of stop locations include one of a restaurant, a shopping center, a playground, a park, and a beach;
providing a ride incentive for routes to a first city in order to rebalance the fleet of autonomous vehicles, wherein providing the ride incentive includes providing, via the user interface, for each of the plurality of stop locations, a coupon for an associated activity at or near the respective stop location;
receiving a stop location selection via the user interface;
identifying a selected charging station waypoint of the plurality of charging station waypoints that is near the selected stop location;
identifying a first autonomous vehicle from the fleet of autonomous vehicles that has sufficient charge to drive to the pick-up location, from the pick-up location to the selected stop location, and from the stop location to the selected charging station waypoint;
assigning the route request to the first autonomous vehicle;
routing the first autonomous vehicle to the pick-up location for passenger pick-up;
routing the first autonomous vehicle to the stop location for passenger drop-off;
routing the first autonomous vehicle from the stop location to the selected charging station waypoint for recharging; and
routing the first autonomous vehicle from the selected charging station waypoint to the stop location for passenger pick-up.

13. The method of claim 12, wherein the user interface for selection of one of the plurality of stop locations includes associated attractions at each of the plurality of stop locations.

14. The method of claim 12, further comprising determining a route, at the routing coordinator, for the first autonomous vehicle to the pick-up location and from the pick-up location to the stop location.

15. The method of claim 1, wherein the fleet of autonomous vehicles includes a first set of autonomous vehicles in the first city and a second set of autonomous vehicles in a second city and further comprising coordinating routes for the first and second sets of vehicles in the first and second cities.

16. The method of claim 15, further comprising detecting an imbalance in the first and second sets of autonomous vehicles relative to route requests in the first and second cities, wherein the imbalance includes the first city having too few vehicles and the second city having too many vehicles.

17. The method of claim 16, further comprising detecting the first set of vehicles is too small and, wherein providing the ride incentive includes providing a low price on rides that move vehicles from the second set to the first set.

18. The method of claim 17, further comprising providing ride sharing incentives for rides from the first city to the second city to minimize a number of vehicles moving away from the first city.

19. The method of claim 18, further comprising transferring vehicles from a third set of vehicles to the first set, and transferring vehicles from the second set to the third set, wherein the third set of vehicles is in a third city, and wherein the third city is between the first and second cities.

20. The method of claim 1, further comprising autonomously connecting to a charger at the first charging station waypoint and recharging the first autonomous vehicle.

* * * * *